(12) United States Patent
Rajagopalan et al.

(10) Patent No.: US 9,887,497 B1
(45) Date of Patent: Feb. 6, 2018

(54) DEVICE CONNECTOR WITH REDUCED ELECTROMAGNETIC NOISE

(71) Applicant: Amazon Technologies, Inc., Seattle, WA (US)

(72) Inventors: Jagan Vaidyanathan Rajagopalan, San Jose, CA (US); Akshay Mohan, Sunnyvale, CA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 0 days.

(21) Appl. No.: 15/179,522

(22) Filed: Jun. 10, 2016

(51) Int. Cl.
*H01R 13/6597* (2011.01)
*H01R 12/70* (2011.01)
*H04N 21/4363* (2011.01)

(52) U.S. Cl.
CPC ..... *H01R 13/6597* (2013.01); *H01R 12/7076* (2013.01); *H04N 21/43635* (2013.01); *H04N 21/43637* (2013.01)

(58) Field of Classification Search
CPC ............ H01R 13/6597; H01R 13/6599; H01R 13/66; H01R 13/6608; H01R 13/6616; H01R 13/6625; H01R 13/665; H01R 13/6658; H04N 21/43635; H04N 21/43637
See application file for complete search history.

(56) References Cited

U.S. PATENT DOCUMENTS

| 5,499,935 | A * | 3/1996 | Powell | H01R 13/66 439/182 |
| 6,420,789 | B1 * | 7/2002 | Tay | G01R 1/0408 257/672 |
| 6,448,664 | B1 * | 9/2002 | Tay | G01R 1/0408 257/48 |
| 7,255,610 | B2 * | 8/2007 | Oohashi | B29C 37/005 264/272.17 |
| 8,491,313 | B2 * | 7/2013 | McNamara | H01R 13/6461 439/59 |
| 8,814,595 | B2 * | 8/2014 | Cohen | 439/607.07 |
| 9,265,170 | B2 * | 2/2016 | Swaminathan | H01R 12/716 |
| 2001/0040282 | A1 * | 11/2001 | Corisis | H01L 23/3107 257/686 |
| 2002/0067301 | A1 * | 6/2002 | Steinbach | H03M 1/146 341/156 |
| 2002/0188467 | A1 * | 12/2002 | Eke | G06F 19/3418 705/2 |
| 2004/0189554 | A1 * | 9/2004 | Russ | G09G 3/20 345/80 |
| 2005/0270286 | A1 * | 12/2005 | Hirvonen | G06K 9/00214 345/422 |

(Continued)

*Primary Examiner* — Harshad C Patel
(74) *Attorney, Agent, or Firm* — Quarles & Brady LLP

(57) ABSTRACT

An apparatus includes a circuit board including a contact pad. The circuit board includes one or more chips on the circuit board. The circuit board further includes a signal pin having a first end, a second end, and an intermediate portion between the first end and the second end. The first end of the signal pin is in contact with the contact pad, where the signal pin has a resonant frequency outside a predetermined frequency range. The apparatus includes a lossy dielectric material surrounding the intermediate portion of the signal pin, where the lossy dielectric material is configured to absorb radio frequency signals from the signal pin in the predetermined frequency range.

17 Claims, 9 Drawing Sheets

(56) References Cited

U.S. PATENT DOCUMENTS

| | | | |
|---|---|---|---|
| 2008/0043781 A1* | 2/2008 | Taskiran | H04L 12/2856 370/509 |
| 2008/0302414 A1* | 12/2008 | den Boer | H01L 31/022466 136/256 |
| 2009/0292336 A1* | 11/2009 | Nishida | A61N 1/0529 607/45 |
| 2011/0130627 A1* | 6/2011 | McGrail | A61B 1/00016 600/109 |
| 2012/0099029 A1* | 4/2012 | Nejat | G06F 3/1431 348/840 |
| 2012/0229609 A1* | 9/2012 | Yamada | H04N 13/0264 348/46 |
| 2013/0016285 A1* | 1/2013 | Combes | H04N 9/3155 348/572 |
| 2014/0001610 A1* | 1/2014 | Ikuta | H01L 23/3121 257/664 |
| 2014/0073183 A1* | 3/2014 | Golko | H01R 13/6594 439/607.34 |
| 2014/0073186 A1* | 3/2014 | Webb | H01R 23/70 439/607.58 |

\* cited by examiner

DEVICE CONNECTOR WITH REDUCED ELECTROMAGNETIC NOISE

BACKGROUND

Electronic devices can be interconnected by data connectors, and particularly video and audio connectors, to enable the transfer of video and audio signals. Electronic devices may include, without limitation, electronic book ("eBook") readers, mobile phones, video gaming systems, televisions, home theaters, speakers, media sticks, and desktop and laptop computers. When the electronic devices are connected to one another, the video and audio signals are transmitted through a physical medium, such as a cable or wire that physically connects the electronic devices.

In an ideal environment, the video and audio signals are transmitted through the electrical connectors and cables without generating any unwanted electromagnetic radiation, often referred to as noise. Such noise may interfere with the operation of one of the connected electronic devices, or even the operation of other, nearby electronic devices.

As the frequencies of the video and audio signals being communicated through an electronic connector increases, so too does the frequency of the noise generated by such connector. If the data rate of the video and audio signals is sufficiently high, the electronic connectors may radiate electromagnetic energy having a frequency that overlaps with a wireless communication frequency or channel used by a nearby wireless communication system. In that case, if the noise is of sufficient magnitude, the noise may interfere with signals in the communication channel, making the wireless communication system unable to fully recover and decode the signals. Consequently, the wireless communication system may be forced to increase transmission power or reduce transmission data rate in order to communicate successfully.

BRIEF DESCRIPTION OF THE DRAWINGS

The detailed description is set forth with reference to the accompanying figures. The use of the same reference numbers in different figures indicates similar or identical items or features.

DETAILED DESCRIPTION

Figure 1:
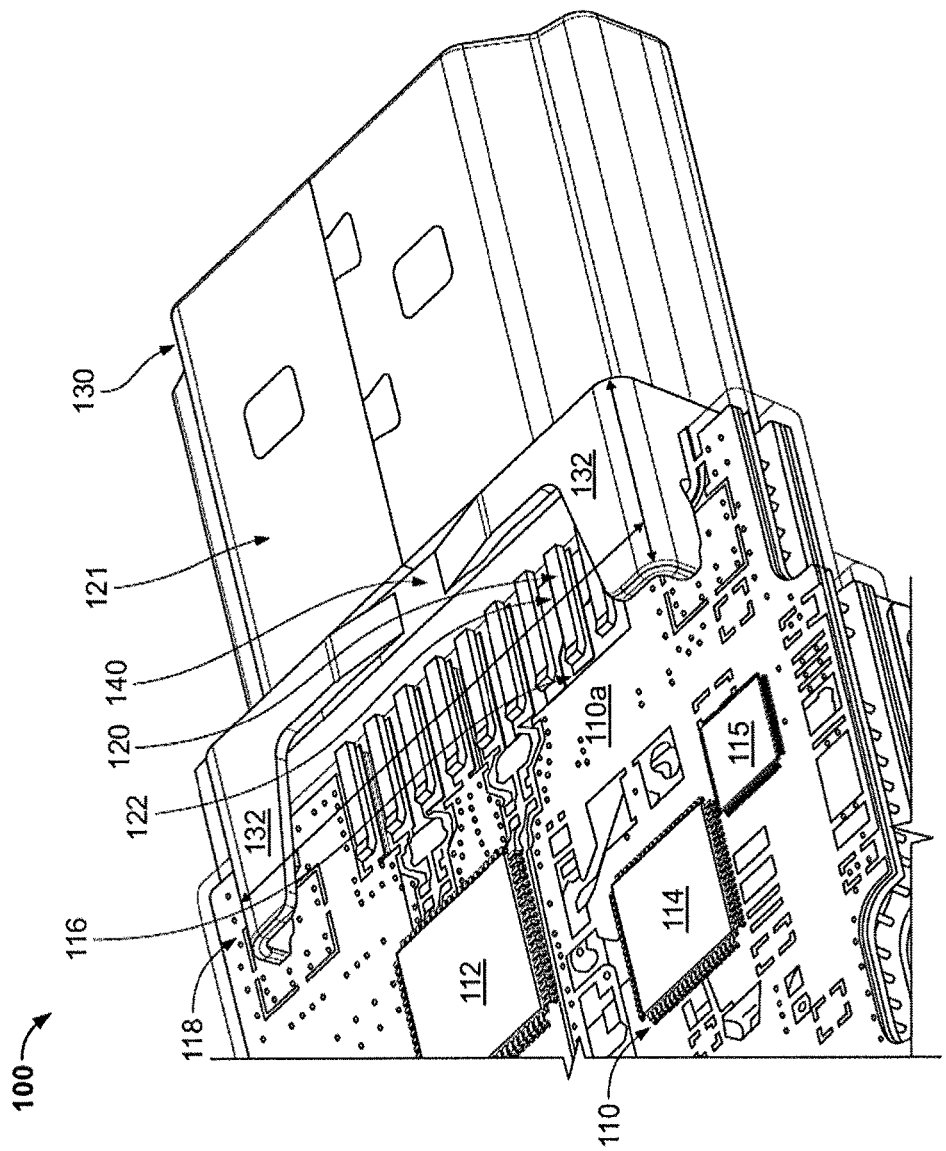
FIG. 1 is a perspective view illustrating a portion of an example electronic device.

Smaller electronic devices are popular because they offer increased processing capacity and functionality. However, a downside to providing smaller devices with increased functionality is that a greater number of components are packaged into a smaller device volume, and these components may electrically interfere with one another.

For example, media sticks are electronic devices that combine video processing capabilities and wireless data transfer capabilities into a single, small platform. A media stick generally includes a suitable connector to couple the media stick to a television or other type of display device. When the media stick is connected to a suitable port on the television, the media stick can transmit high quality video signals to the television, which can, in turn, be displayed by the television. The media stick also includes a wireless communication system, enabling the media stick to download video content (e.g., from a video streaming service or device) that can then be converted into suitable video signals for transmission to the television. The wireless communication system also enables the media stick to communicate wirelessly with control devices, enabling appropriate user control of the stick's operations. For example, a user may control the media stick using a smart phone, a remote, a tablet, a computer, or other electronic devices running a corresponding application and in wireless communication with the media stick.

Within such an electronic device, certain sensitive device components, such as the wireless communication system, may need to coexist with electromagnetic noise generating components. In the case of a media stick, for example, the stick's data connectors can be a source of electromagnetic noise.

The co-location of noisy data connectors with the device's communication systems and, specifically, the communication system's antennas, may pose several difficulties. In an ideal environment and for optimal antenna performance, there should be no metals in an effective volume around the antenna. However, in a packaged device, such as a media stick, the electronic connectors for data transfer, such as a high-definition multimedia interface (HDMI) connector, typically include metal components and are located nearby the device's antenna or antennas. Because the electronic connectors can be sources of electromagnetic noise, such proximity can affect antenna performance.

HDMI is a standard that defines an audio/video interface for transferring uncompressed video data and compressed or uncompressed digital audio data from an HDMI-compliant source device, such as a display controller, to a compatible computer monitor, video projector, digital television, digital audio device, or other display or audio device. In recent years, more and more electronic devices are incorporating HDMI connectors. Generally, HDMI connectors include both male and female connectors. Display devices, such as most high definition televisions include one or more HDMI female connectors. Similarly, many electronic devices that are designed to transmit video or audio content also include female HDMI connectors. To couple a device configured to transmit video or audio content to a television, for example, a cable including two male connectors is coupled to each of the female connectors. But for smaller electronic devices, such as a media stick, in which a cable is not desired, the electronic device may instead include a male HDMI connector and couple directly to the female connector in the television. Such devices are referred to herein as HDMI devices. Media sticks are one type of HDMI device.

In an HDMI device, the HDMI connector may radiate noise into the wireless communication channels and cause degradation of the wireless communication capabilities of the HDMI device. HDMI connectors, as described herein, include a plurality of HDMI signal pins, where each signal pin may carry a portion of the video signal or other data signal being transmitted through the HDMI connector by the HDMI device. In some instances, the HDMI signal pins may function as small antennas to broadcast or radiate undesired electromagnetic signals in the wireless communication channels. In that case, the signal broadcast by the HDMI signal pin is largely dependent upon the data signal being transmitted through the signal pin. As the frequency of the data signal changes, the frequency of the electromagnetic noise being radiated by the signal pin may also increase. If, for example, the HDMI device communicates with a wireless router using a 2.4 GHz frequency band or a 5 GHz frequency band, the HDMI signal pins could interfere with the communication signals if the HDMI signal pins should radiate electromagnetic signals in the same frequency band. Thus, it can be desirable to design HDMI devices and, specifically, HDMI connectors with reduced noise radiation into the wireless communication bands.

To reduce the undesired noise radiation from the HDMI signal pins, an HDMI device is presented in which the device's HDMI connector is configured to inhibit or otherwise limit the radiation of electromagnetic noise in particular frequency bands. In an HDMI device that includes a wireless communication system, the HDMI connector may be configured to inhibit noise radiation in the frequency bands utilized by the wireless communication system for transmitting and receiving communication signals. Specifically, within the HDMI connector, the lengths of the signal pins can be selected so that the signal pins are inefficient at generating electromagnetic radiation at frequencies that overlap with those used by the wireless communication system. In some embodiments, to further inhibit the emission of electromagnetic radiation, a lossy dielectric material may be located within the HDMI connector and formed around at least a portion of one or more of the connector's signal pins. The lossy dielectric material can be configured to absorb, and thereby inhibit the radiation of, electromagnetic signals having frequencies that overlap with those of the wireless communication system.

In accordance with the present disclosure, different HDMI connectors having signal pins of different lengths or different lossy dielectric materials may be designed in order to reduce electromagnetic radiation in different frequency bands. When constructing the present HDMI connector for a particular application, the frequency components of the undesired noise radiation and the relevant parameters of the HDMI connector that affect the frequency components are identified. After identifying the relevant parameters, a simulation process may be utilized to determine whether the frequency components of the undesired noise may be modulated or otherwise affected by changing the relevant parameters. Based on the simulation results, parameters are then selected for the HDMI connector to shift the frequency components of undesired noise radiated by the HDMI connector away from the wireless communication channels used by the HDMI device or other electronic devices.

For example, one such parameter is a pin length of the HDMI signal pins in the HDMI connector. By adjusting the lengths of the HDMI signal pins, a resonant frequency of each signal pin can be controlled so that the signal pins only radiate electromagnetic signals in a frequency band that is different from the HDMI device's wireless communication channels or significantly reduce the radiation of electromagnetic signals in a frequency band that is used by the device's wireless communication system.

Figure 2A:
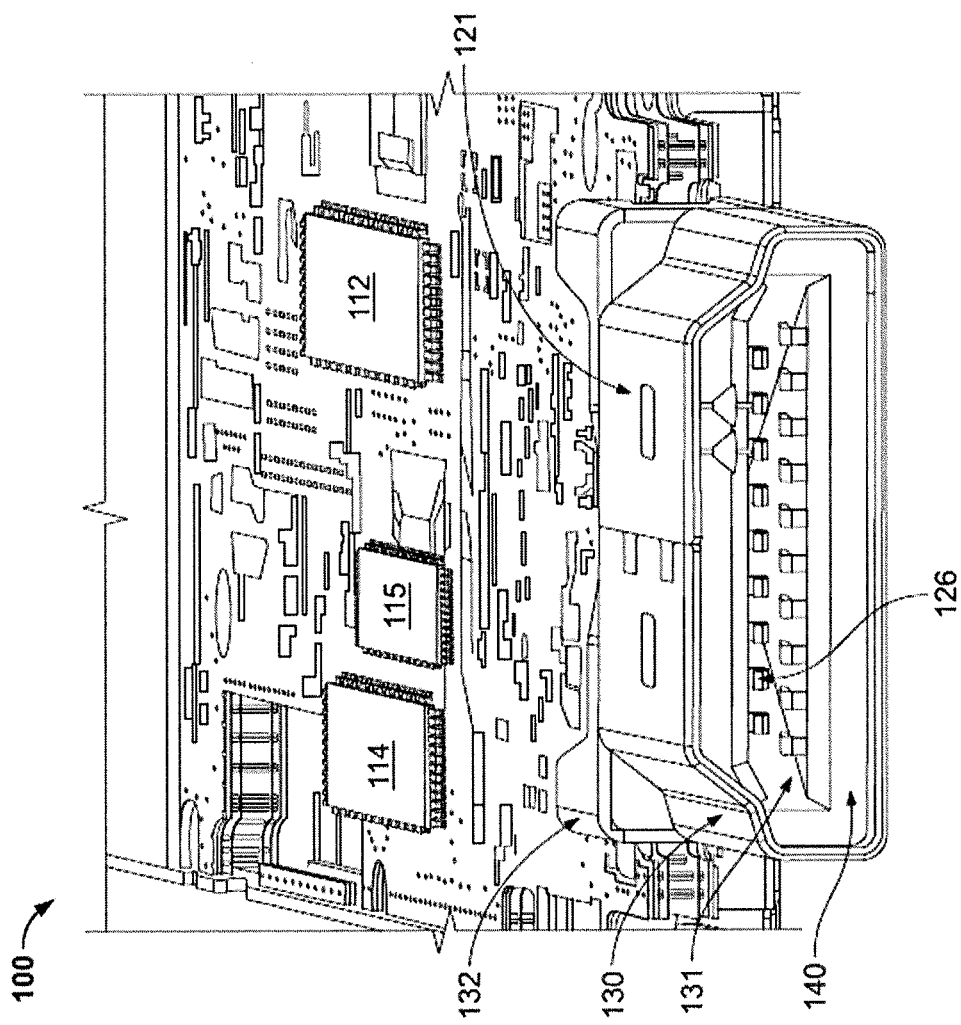
FIG. 2A illustrates a second view of the example electronic device of FIG. 1.
Figure 2B:
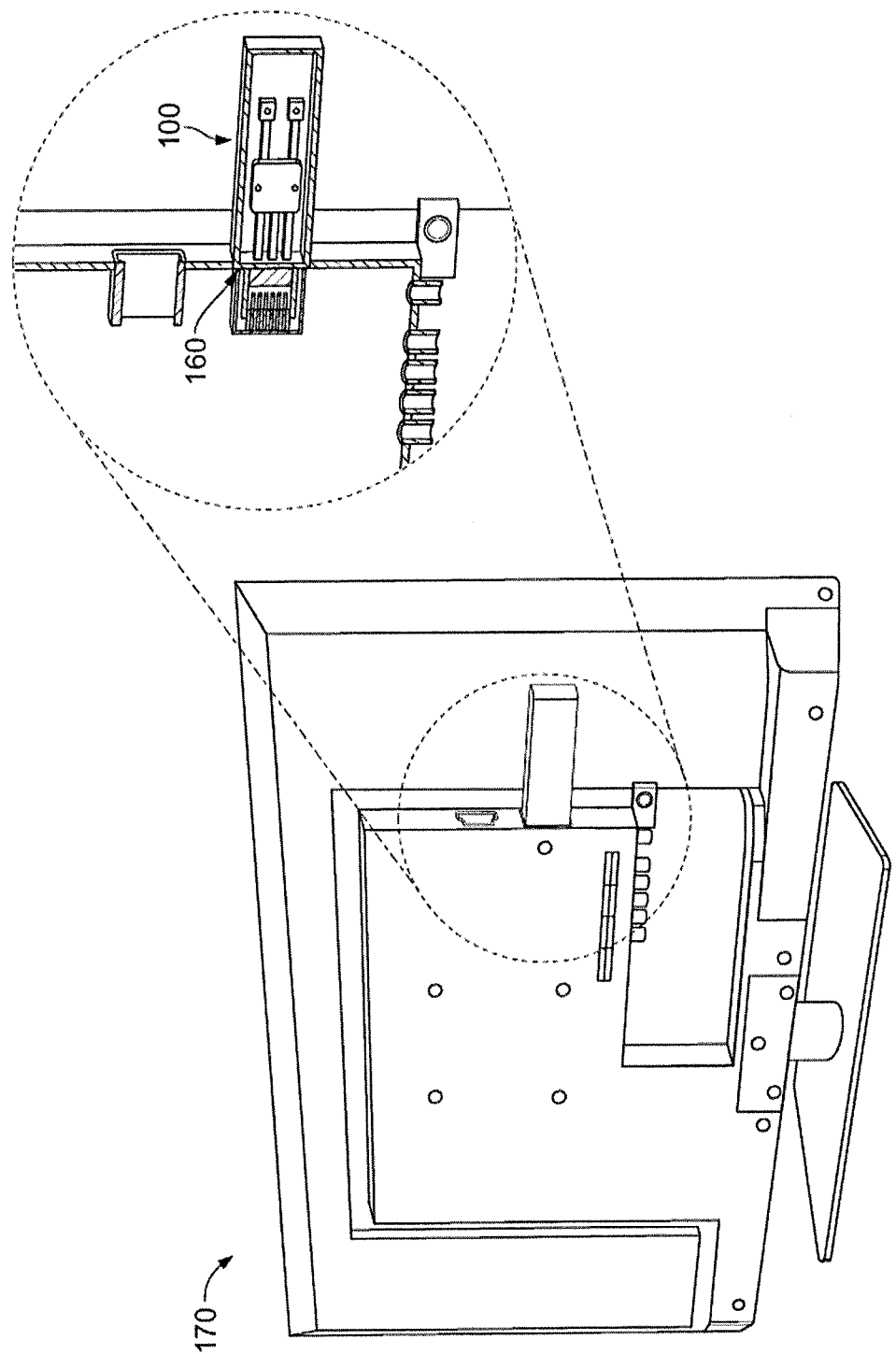
FIG. 2B illustrates an example use of the present electronic device in which the device's HDMI connector is plugged into a complementary HDMI connection port in a television.
Figure 3:
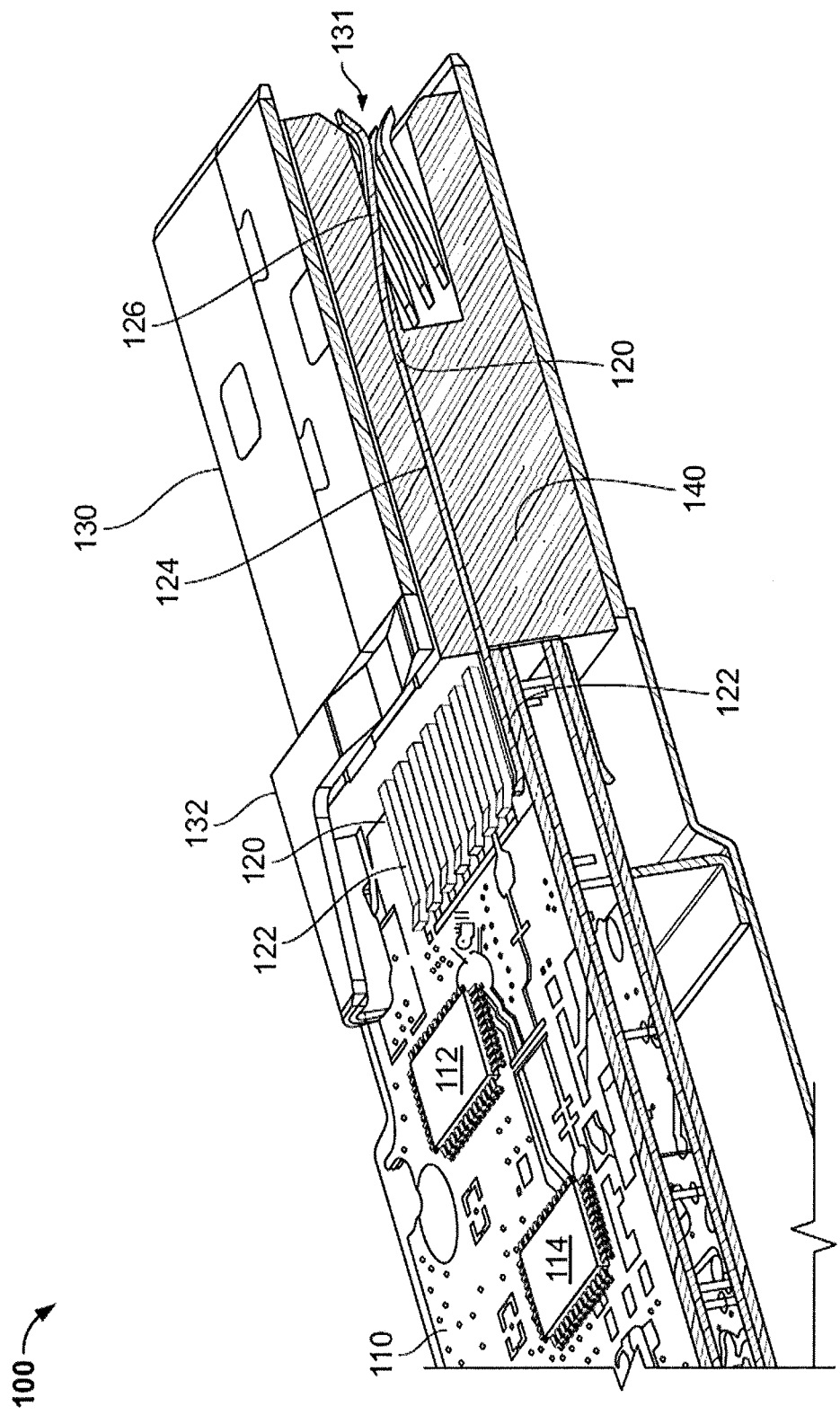
FIG. 3 illustrates a third view of the electronic device of FIG. 1 depicting a cross-sectional view of a portion of the electronic device.

Turning now to the figures, FIG. 1 illustrates an example HDMI device 100 according to various embodiments. FIG. 2A illustrates a second view of the example HDMI device 100 of FIG. 1, according to various embodiments. FIG. 2A illustrates the example HDMI device 100 viewed from the male HDMI connector 121 end. FIG. 2A shows that the example HDMI device 100 includes multiple HDMI signal pins surrounded by the male HDMI shell 130. To depict an example usage of HDMI device 100, FIG. 2B illustrates the HDMI device 100 coupled to an example television 170. In such a configuration, television 170 includes a female HDMI connector 160 on the back of the TV configured to engage with HDMI connector 121 of HDMI device 100. The female HDMI connector 160 includes multiple contacts corresponding to the HDMI signal pins in the male HDMI connector. FIG. 3 illustrates a third view of the HDMI device 100 of FIG. 1. In FIG. 3, a portion of the male HDMI shell 130 is removed to show the structure internal to HDMI shell 130.

In one embodiment, HDMI device 100 may be an HDMI device that includes a circuit board 110, such as a printed circuit board (PCB). The circuit board includes a substrate 110*a*. The circuit board 110 may include a video processor 112 on the substrate 110*a*. The video processor 112 may be configured to process video data. For example, the video processor 112 may process video data that includes content in various video modes, such as 720p, 1080p, or 4K, where each mode may correspond to different resolutions or frame rates in the video content. In some cases, for example when the size of HDMI device 100 is relatively small, the video processor 112 includes a low-power mobile multimedia processor architecture that is sufficiently flexible and efficient to decode video data in real time.

As the video processor 112 decodes video data and generates a suitable output video signal at the desired video mode (e.g., 720p, 1080p, or 4K), that video signal is transmitted from the video processor 112 to the signal pins 120 of the HDMI connector 121. The video signal is then communicated through the signal pins 120 to the connected display device (e.g., television 170 or computer display screen).

The frequency component of RF radiation from the HDMI signal pins 120 may vary based upon the frequency of the video signal being transmitted through the signal pins 120. Generally, the frequency of the video signal will increase as the video signal's resolution increases. Video data signals that include common high definition video modes (e.g., 720p, 1080p, or 4K) have been found to have frequency components that overlap with the frequency bands used by conventional wireless communications technologies, referred to as the working frequencies of the wireless communications technologies. Furthermore, conventional HDMI connector designs have been found to include HDMI signal pins having resonance frequencies that fall within the frequency bands used by conventional wireless communications technologies. Accordingly, in a conventional HDMI connector with signal pins transmitting high definition video signals, the signal pins can radiate noise that can interfere with nearby wireless communication systems.

Figure 6:
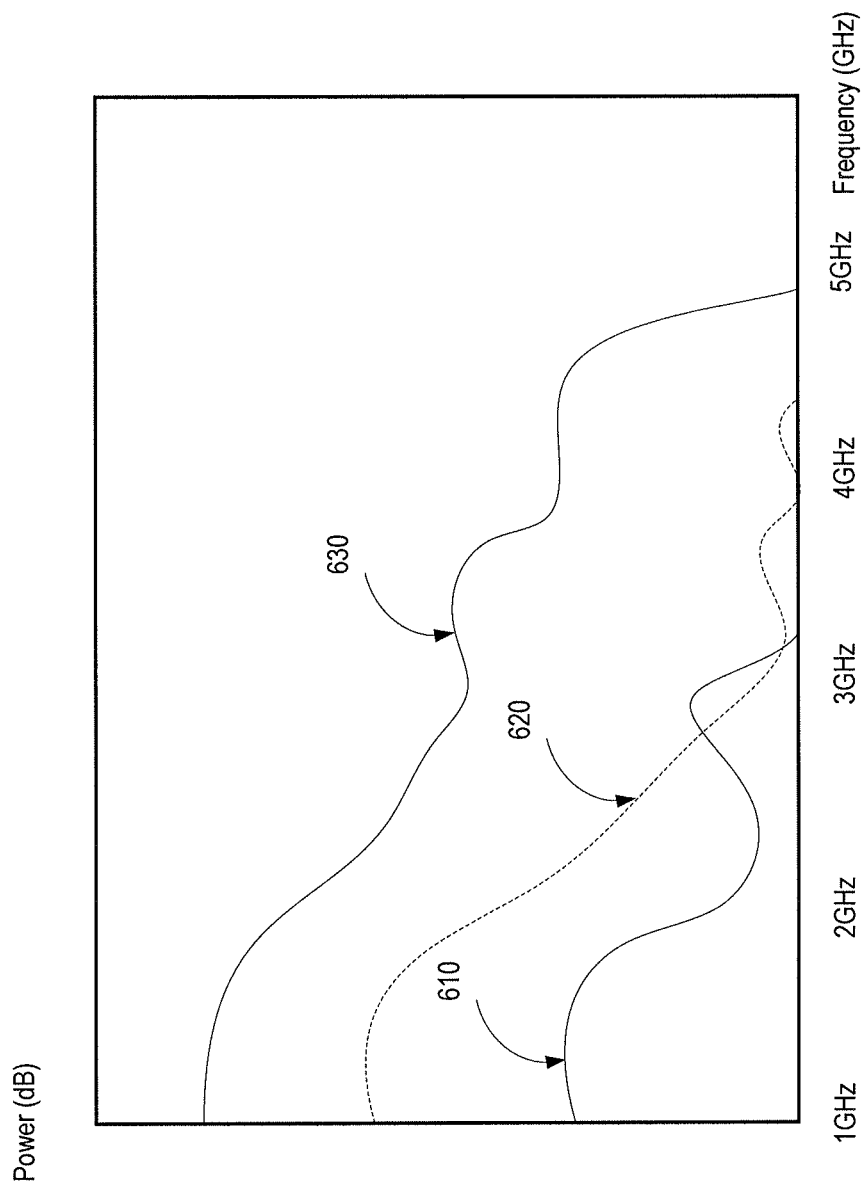
FIG. 6 is a chart that illustrates different frequencies of electromagnetic noise corresponding to various high definition video modes.

FIG. 6 shows a chart that illustrates the different power spectral densities corresponding to the high definition video modes (e.g., 720p, 1080p, or 4K). The horizontal axis of FIG. 6 represents frequency in GHz while the vertical axis of FIG. 6 represents power spectral density in dB/Hz. Generally, the higher the video definition, the higher the frequency of noise generated by the signal pins. For example, when a conventional HDMI connector streams 1080p data, the corresponding power spectral density 620 may extend up to 4.8 GHz, which could overlap, at least in part, with the 5.0 GHz Wi-Fi frequency band. When the conventional HDMI connector streams 720p data, the corresponding power spectral density 610 may extend up to 3.5 GHz. When the conventional HDMI connector streams 4K data, the corresponding power spectral density 630 may extend up to 5.0 GHz. Note that the shape of the power spectral densities may vary for the same signal pin when the signal pin is used in different HDMI connectors with different circuit boards because the power spectral densities from the HDMI connectors depend on the interactions of different hardware components on the circuit board and their proximities.

In certain embodiments, the circuit board 110 includes a wireless communication processor 114 on the substrate 110a, where the wireless communication processor 114 is configured to utilize one or more antennas 115 to transmit and receive radio frequency signals in a predetermined range of wireless communication frequencies or channel. For example, the wireless communication processor 114 may support 802.11a/b/g/n Wi-Fi networks. The 802.11a communication standard uses the 5 GHz band defined by Unlicensed National Information Infrastructure (U-NII). The 802.11b and 802.11g communication standards use the 2.4 GHz band defined by Industrial, Scientific and Medical (ISM). The 802.11n communication standard can use either the 2.4 GHz or the 5 GHz band. Both the 2.4 GHz band and the 5 GHz band include multiple channels to be used by multiple devices.

The predetermined range of wireless communication frequencies utilized by the wireless communication processor 114 may include one or more Wi-Fi channels in one or more communication bands. Here, a frequency band is an interval in the frequency domain, which may be delimited by a lower frequency and an upper frequency. For example, the 2.4 GHz band may include Wi-Fi channels having a lower frequency of 2.4 GHz and an upper frequency of 2.5 GHz. The 5 GHz band may include Wi-Fi channels having a lower frequency of 4.8 GHz and an upper frequency of 5.2 GHz. The wireless communication processor 114 may support other wireless communication standards such as Bluetooth.

In one embodiment, the circuit board 110 includes multiple contact pads 116 on a first end 118 of the substrate 110a. The contact pads 116 each include a conductive material deposited over a surface of the substrate 110a. One or more traces or other electrical interconnects may be formed over the surface of the substrate 110a to electrically interconnect each one of the contact pads 116 to one or more of the other components mounted to or on the substrate 110a. Each of the signal pins 120 is connected to or is in contact with at least one of the contact pads 116.

Within HDMI device 100, each of the contact pads 116 may have different functions according to the HDMI standard. Additionally, depending upon the applicable standard, the substrate 110a may include a different number of contact pads 116, and the HDMI connector 121 may include a different number of corresponding signal pins 120. For example, a type A HDMI connector may include 19 different signal pins, with signal pins 1-9 for transition-minimized differential signaling (TMDS) data, signal pins 10-12 for TMDS clock signals, signal pin 13 for consumer electronics control (CEC), signal pin 14 is reserved, signal pin 15 for serial clock for display data channel (DDC), signal pin 16 for serial data for DDC, signal pin 17 connected to ground, signal pin 18 connected to a 5 V power source, and signal pin 19 for hot plug detect.

Accordingly, the HDMI device 100 can include many HDMI signal pins 120. Given their relative proximity, when a single signal pin generates radiation noise, one or more of the other pins can become electromagnetically coupled to that single pin, resulting in all the coupled pins radiating the same noise.

As shown in FIG. 3, each of the HDMI signal pins 120 has a first end 122, a second end 126, and an intermediate portion 124 between the first end 122 and the second end 126. The first end 122 of one of the HDMI signal pins 120 is generally in contact with a contact pad 116 on the first end 118 of the substrate 110a. In some HDMI connectors 121, the signal pins 120 may be located on only one side of substrate 110a. In other HDMI connectors 121, such as that illustrated in FIGS. 1-3, the signal pins 120 of the HDMI connector 121 are on both sides of substrate 110a. In that case, contacts pads 116 may be formed on both the top and bottom surfaces of substrate 110a. Signal pins 120 can then be positioned with the HDMI connector 121 to make contact with the various contact pads 116 formed on either surface of the substrate 110a.

Figure 4A:
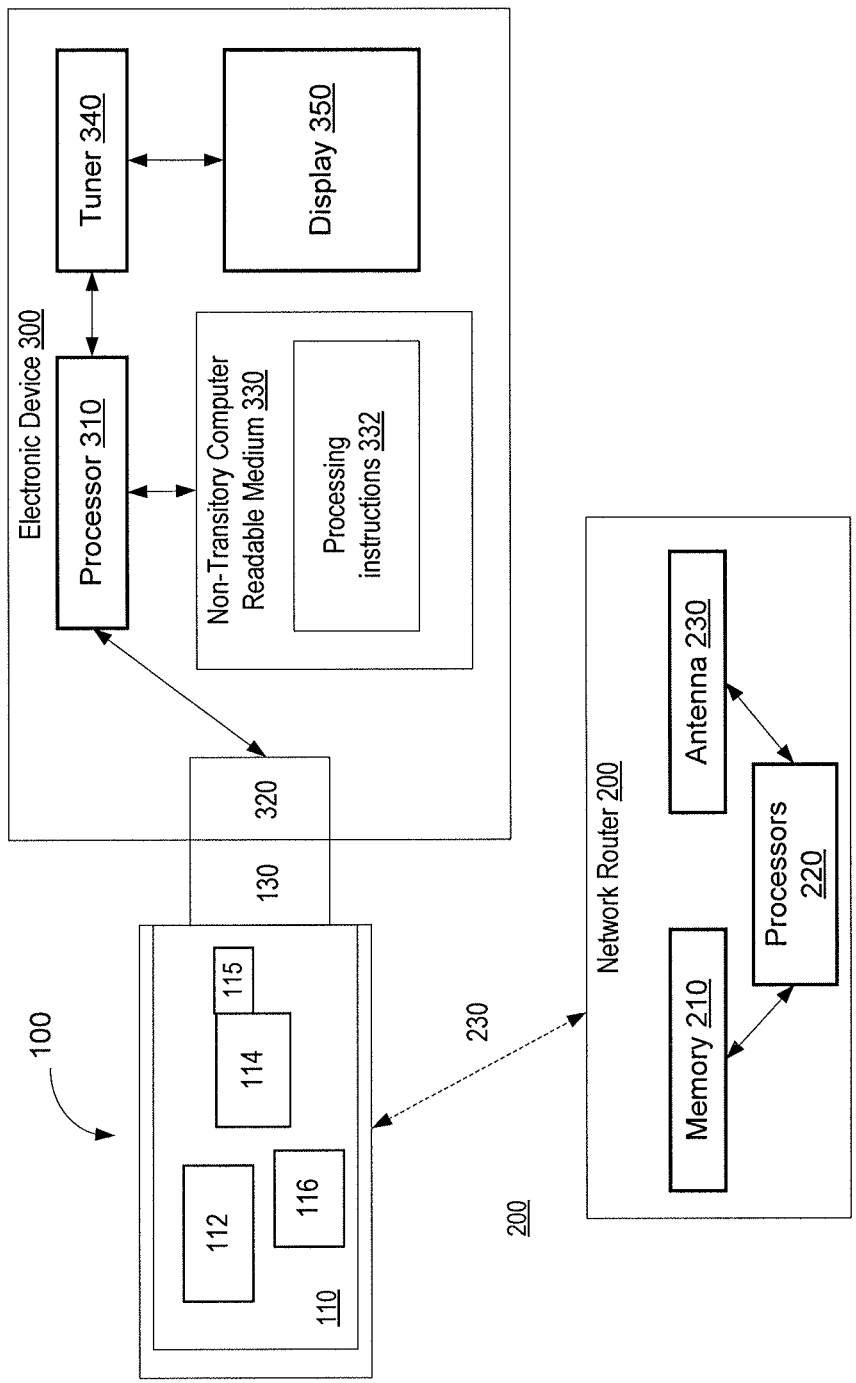
FIG. 4A is a block diagram illustrating an example operating environment of the electronic device.
Figure 4B:
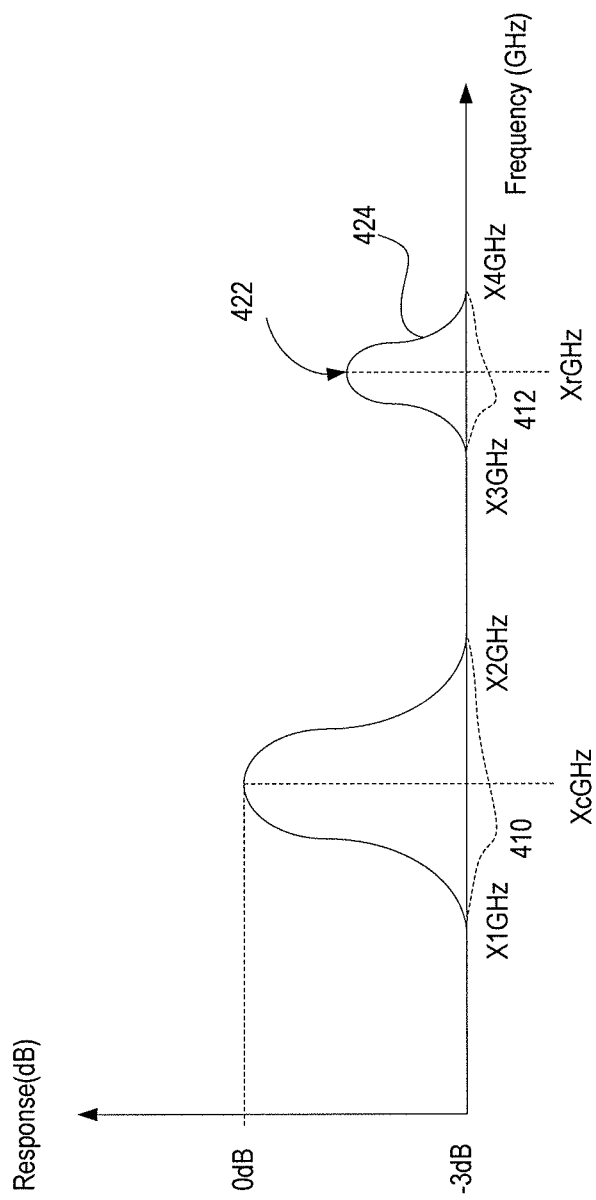
FIG. 4B is a chart illustrating a separation between a wireless frequency band and a noise radiation frequency band.
Figure 4C:
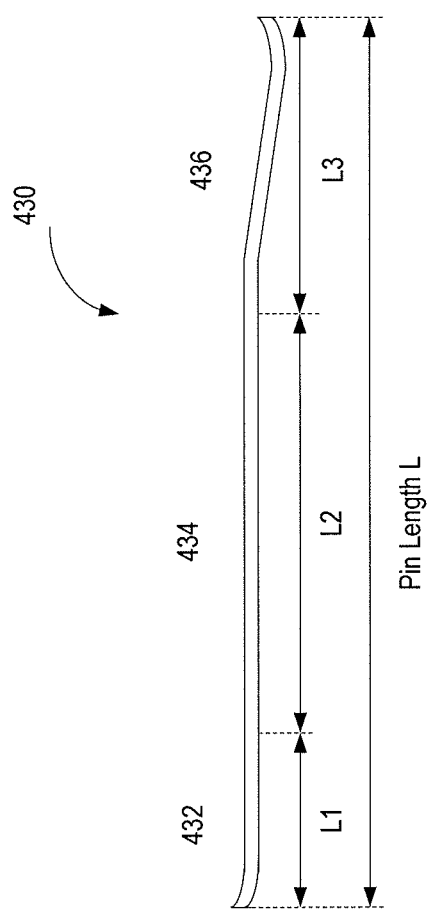
FIG. 4C is a side view of a signal pin of the electronic device.

To further illustrate the structure and configuration of each of the signal pins 120, FIG. 4C illustrates an example signal pin 430 that may be installed into the HDMI connector 121 of an HDMI device 100, according to various embodiments. Here, the signal pin 430 includes a first end 432, a second end 436, and an intermediate portion 434 between the first end 432 and the second end 436. The first end 432 has a length of L1, which can range between 2.0 mm to 5.0 mm. The second end 436 has a length of L3, which may be fixed according to the HDMI standard. Accordingly, in some embodiments, when adjusting the overall length of the signal pin 430, the length of L3 is not changed, as L3's geometry is specifically configured to engage the length of the corresponding female HDMI connector. Instead, the lengths L1 and L2 may be adjusted to achieve a desired length for signal pin 430. The length of L3 may be 5.5 mm. The intermediate portion 434 has a length of L2, which is between 2.5 mm to 5.5 mm. The whole length of the signal pin 430 is L, which is between the range of 10.0 mm to 13.0 mm, or more preferably between 11.0 mm and 12.5 mm. Thus, the length of segments L1 and L2 can be changed to adjust the resonant frequencies of the signal pins. For example, the total length of L is 12.2 mm with L1+L2 equals 6.7 mm. A connector device, such as an HDMI connector, may include multiple signal pins, where each signal pin may have dimensions falling within the above dimension rages.

Returning to FIG. 3, each one of the HDMI signal pins 120 has a resonant frequency. Being conductive, the signal pins 120 can operate as antennas for signals passing through the signal pins 120. As such, during operation the signal pins 120 will radiate some electromagnetic noise. Due to their size, however, the signal pins 120 will be more effective antennas for signals of particular frequencies, and the signal pins 120 will be less effective antennas for signals of other frequencies. The signal pins 120 act as the most effective antennas for signals at or about the same frequency as the resonance frequency of the signal pins 120. As such, in order to minimize the interference with the wireless communications performed by the wireless communication processor 114 of HDMI device 100, the signal pins 120 are configured with resonance frequencies that are offset from and do not fall with the range of frequencies utilized by the wireless communication processor 114 for wireless communications. With the signal pins 120 so configured, the signal pins 120 become inefficient antennas for electromagnetic noise radiation that could otherwise interfere with the operation of the wireless communication processor 114. This can, in turn reduce the magnitude of electromagnetic noise radiated by the signal pins 120 that could be detrimental to the operation the wireless communication processor 114.

In a conventional HDMI connector, the signal pins have a length of 14.7 mm. The resonance frequency of such a signal pin falls within the ranges of frequencies used by conventional wireless communications technologies such as WiFi channels at 2.4 GHz or 5.0 GHz. Accordingly, a conventional signal pin has a resonant frequency making the pin an excellent antenna for radiating the very electromagnetic noise that will interfere with wireless communications.

In the present configuration, however, the signal pins 120 are specifically sized to have resonant frequencies away from those used for wireless communications. For example, in the present HDMI device 100, if the wireless communication processor 114 is configured to operate according to the IEEE 802.11 standard family, the signal pins 120 in the HDMI connector 121 can be sized to have a resonance frequency greater than a preset upper threshold, for example, 5.0 GHz. This makes the signal pins 120 poor antennas for noise that will interfere with wireless communications.

To illustrate this approach, FIG. 4B shows a chart illustrating a wireless frequency band utilized by a wireless communication processor 114 in device 100. FIG. 4B also illustrates the resonant frequency and noise radiation frequency of signal pins 120 in the HDMI device 100. In FIG. 4B, the vertical axis indicates a magnitude of the relevant signal, while the horizontal axis represents frequency.

In the depicted example situation, the wireless communication processor 114 HDMI device 100 uses a frequency band 410 from X1 GHz to X2 GHz for transmitting and receiving wireless communication signals. The HDMI signal pins 120 are configured with a resonance frequency 422 of Xr GHz that falls outside of the frequency band 410. As shown in FIG. 4B, the signal pins 120 will radiate some noise with frequencies that are lower and higher than the resonance frequency 422 (see, for example, curve 424, which depicts the noise output of the signal pins 120 over frequency band 412). For example, the magnitude of those noise levels may have a bell shape 424 between X3 GHz and X4 GHz, which diminishes as the difference between the frequency of the radiated noise and the resonant frequency 422 increases. Note that the bell shape 424 is just an example of the radiation pattern and the actual radiation pattern may change when the length of the HDMI pin changes. The radiation pattern may also be affected by other factors such as the interaction between the HDMI pin and surrounding hardware components in close proximity.

As illustrated by FIG. 4B, the frequency bands 410 and 412 do not overlap. As such, the signals pin 120 are designed to generate noise in band 412, thereby reducing interference with the wireless communications occurring in band 410.

According to one or more embodiments of the disclosure, the resonant frequency of the HDMI signal pin is in the range of 5.2 GHz or higher for a signal pin length in the range of 11.0 mm to 13.00 mm. For frequencies that fall outside of the above range (i.e., less than 5.2 GHz), the noise radiation level attenuated to levels below a predetermined value, such as −10 dBm.

Generally, the resonant frequency of the signal pins 120 is determined by the length of the signal pins. By selecting an appropriate length, the resonant frequency of the signal pins 120 can be controlled to reduce the amount of RF radiation noise generated by the signal pins 120 in the predetermined range of wireless communication frequencies. When designing a particular HDMI device 100, therefore, the signal pins 120 are designed so that their respective resonant frequencies do not overlap with the frequencies utilized by the wireless communications system of the HDMI device 100.

One approach for designing the lengths of the signal pins 120 for a particular HDMI device 100 may involve using simulations to predict the resonant frequency of the signal pins 120. For example, the electromagnetic fields generated by the HDMI device may be modeled using simulation software based on solving Maxwell's equations using a Finite Integration Algorithm. One such simulation software includes the 3D electromagnetic simulation tools developed by Computer Simulation Technology (CST). An approach for simulating the signal pins 120 resonance frequency is described in more detail below with respect to FIG. 5.

To select the physical dimensions of the HDMI signal pins 120, electronic magnetic properties of different material may be simulated with a variety of physical dimensions. The physical dimension of one of the HDMI signal pins 120 may include the length and width of the HDMI signal pin. For each configuration of signal pin having a particular set of dimensions, a corresponding resonance frequency for the signal pin is calculated or predicted as part of that simulation. The dimensions of the signal pin can then be fine-tuned (and the simulation run again to confirm the results) to achieve a desired resonance frequency and radiation pattern for the signal pin.

For example, based on the simulation results, the length of the HDMI signal pin may be in the range of 10.0 mm to 13.0 mm so that the resonant frequency of the HDMI signal pin does not overlap with the 2.4 GHz or 5 GHz wireless band. In other embodiments, the length of the HDMI signal pin may be in the range of 11.0 mm to 12.5 mm so that the resonant frequency of the HDMI signal pin does not overlap with the 2.4 GHz or 5 GHz wireless band.

In an embodiment, the length of one of the HDMI signal pins 120 may be selected based on simulation results so that the undesired electromagnetic noise radiated from the HDMI signal pins 120 is below a preset threshold in the predetermined range of wireless communication frequencies.

As shown in FIGS. 1-3, the HDMI device 100 includes a metal shell 130 attached to the first end 118 of the substrate 110a and the HDMI signal pins 120. The metal shell may be made of metal such as copper, etc., and provides a housing for signal pins 120 of HDMI connector 121.

As illustrated, the metal shell 130 is at least partially formed around the intermediate portion 124 and the second end 126 of the HDMI signal pins 120. In some embodiments, the metal shell 130 and the HDMI signal pins 120 may be configured to attach to a female HDMI connector 160, such as that of TV 170 shown in FIG. 2B.

The metal shell 130 includes metal arms 132 engaging the substrate 110a to secure the circuit board 110 to the HDMI signal pins 120. The metal arms 132 provide structural support to the metal shell 130 and the HDMI device 100 generally. An increase in the length of the metal arms 132 can generally increase the overall strength and rigidity of the metal shell 130. For example, if simulations indicate that to achieve a desired resonant frequency for the signal pins 120 of the HDMI connector 121 the length of the signal pins 120 should be reduced, such reduction could reduce the overall rigidity and strength of the HDMI connector 121. In compensation, the length of the metal arms 132 can be increased.

Being conductive, the metal arms 132 may have a second resonant frequency, which may also cause the metal arms 132 to radiate electromagnetic noise that could interfere with the wireless communications of HDMI device 100. As in the case of the signal pins 120, therefore, the geometry of the metal arms 132 may be selected so that the metal arms 132 themselves also have a resonant frequency that falls outside the frequency range utilized for wireless communications.

As shown in FIG. 3, the HDMI device 100 includes a lossy dielectric material 140 disposed inside the metal shell 130 around at least a portion of each of the signal pins 120. Currently, HDMI devices such as HDMI sticks use dielectric material to insulate metal shell 130 from the HDMI signal pins. Here, compared to current HDMI devices, the disclosed HDMI device 100 uses the lossy dielectric material 140 so that the lossy dielectric material 140 can further absorb the noise radiation from the HDMI signal pins.

The lossy dielectric material 140 includes partially conducting medium, in which an electromagnetic wave loses power as the wave propagates through the material due to poor conduction. For example, when the electromagnetic wave propagates along $a_z$ in a lossy dielectric medium, the electromagnetic wave may decrease or attenuate in amplitude by a factor of $\exp(-\alpha z)$, where $\alpha$ is the attenuation constant of the medium. In this disclosure, the lossy dielectric material 140 may have attenuation constant in the range of greater than five.

During fabrication of HDMI device 100, the lossy dielectric material 140 may be melted in a liquid or semi-liquid state before the lossy dielectric material 140 is applied to the inner surface of the metal shell 130 or otherwise deposited within at least a portion of the volume defined by the metal shell 130. In that case, the liquid or semi-liquid state lossy dielectric material 140 can be flowed around each of the signal pins 120. The lossy dielectric material 140 can then cool and solidify in the manner illustrated in FIGS. 1-3. Alternatively or additionally, the lossy dielectric material 140 may be inserted directly into a mold with dimensions configured to fit within the metal shell 130. Once molded, the solid dielectric material 140 could then be installed into the metal shell 130 around each of the signal pins 120 using standard fabrication techniques. Once positioned within the metal shell 130, the lossy dielectric material 140 surrounds and may be in contact with the intermediate portion 124 of the HDMI signal pins 120. For example, the lossy dielectric material 140 may surround the intermediate portion 124 of the signal pins 120 while also partially covering the second end of the signal pins 120. With the intermediate portion 124 of the signal pins 120 surrounded by the lossy dielectric material 140, the lossy dielectric material 140 can absorb at least a portion of any electromagnetic noise radiation generated by the signal pins 120, in turn reducing the amount of noise that radiates from the HDMI connector 121. In some embodiments, the lossy dielectric material 140 can reduce noise radiation by 3 dB to 5 dB at frequencies around 2.4 GHz and 5.0 GHz.

In some embodiments, the lossy dielectric material 140 is configured to absorb radio frequency transmissions in a predetermined range of wireless communication frequencies, such as those used by the wireless communication processor 114 of the HDMI device 100 to transmit and receive communication signals. The lossy dielectric material at least partially covers the first end of the HDMI signal pin.

To enable the metal shell 130 engage with a complimentary (e.g., female) HDMI connector, the lossy dielectric material 140 includes a void 131 that is configured to receive a structure of the complimentary HDMI connector. The void 131 in the lossy dielectric material 140 is configured to expose at least a portion of the second end 126 of each of the signal pins 120. This enables the second end 126 of the signal pins 120 to engage conductive structures (e.g., contact pads) on the complimentary HDMI connector when the metal shell 130 engages with the complimentary HDMI connector.

In an embodiment, the lossy dielectric material 140 includes at least one of a silicon absorber, Teflon, etc. In general, the lossy dielectric material includes a material having a dielectric constant greater than a preset threshold at a room temperature (e.g., between 70 degrees Celsius and 80 degrees Celsius). For example, the preset threshold may be 5 or greater. The lossy dielectric material may have a loss tangent greater than 0.03. Here, a higher dielectric constant indicates more radio frequency radiation may be absorbed by the lossy dielectric material. For example, the lossy dielectric material may include liquid crystal polymer (LCP) material with a dielectric constant of 3 at 5 GHz. The lossy dielectric material may include a material with dielectric constant of 5 or higher at 5 GHz.

As shown in FIG. 3, the HDMI device 100 includes a number of signal pins 120, which each include a first end, a second end, and an intermediate portion between the first end and the second end. Each of the signal pins 120 may have its own resonant frequency. If it is desired that each of the signal pins 120 in the HDMI device 100 have the same resonant frequency, the signal pins 120 may each be of the same dimensions and, specifically, the same length. In various implementations, however, it may be desired that different signal pins 120 have different resonant frequencies. That may be due, for example, to each of the signal pins 120 being responsible for carrying different signals that have different frequencies or data rates. In that case, the dimensions and, specifically, the lengths of each of the signal pins 120 may be adjusted to achieve the desired resonant frequencies for each of the signal pins 120.

Accordingly, when designing an HDMI device 100, in the simulation software, all HDMI signal pins may be modeled and simulated in one simulation environment. Here, all pins are modeled together in the simulation because all HDMI signal pins are in close proximity. A person having ordinary skill in the art would understand that the simulation may only consider a subset of the signal pins if the signal pins are not in close proximity.

FIG. 4A illustrates an example environment in which an example HDMI device 100 may be utilized, according to various embodiments. The example environment may be a home network in a living room, for example. The home network includes an HDMI device 100 plugged into an electronic device 300. For example, the electronic device 300 may be a television that includes a female HDMI connector 320 configured to accommodate the HDMI device 100. The HDMI device 100 includes a circuit board 110 including a video processor 112, a wireless communication processor 114, an antenna 115, and a memory 117. The HDMI device 100 communicates with a network router 200 via a wireless communication channel 230.

The network router 200 includes one or more hardware processors 220, a memory 210 storing instructions and other hardware components including circuitry, etc. The network router 200 also includes an antenna 231 controlled by the one or more processors 220 to transmit and receive wireless communication signals. The electronic device 300 includes a processor 310 connected to a non-transitory computer readable medium 330, which may be configured to store processing instructions 332. The electronic device 300 may include a tuner 340 connected to the processor 310 and the display 350. The processor 310 may access a non-transitory computer readable medium 330 that stores processing instructions 332. The processor 310 may communicate with the HDMI device 100 via the female HDMI connector 320. The processor 310 may also communicate with other devices via the network router 200.

In some examples, the electronic device 300 may include one or more display to display the video data from the HDMI device 100. Both video and audio data may be streamed by the HDMI device 100 from a remote service provider.

Figure 5:
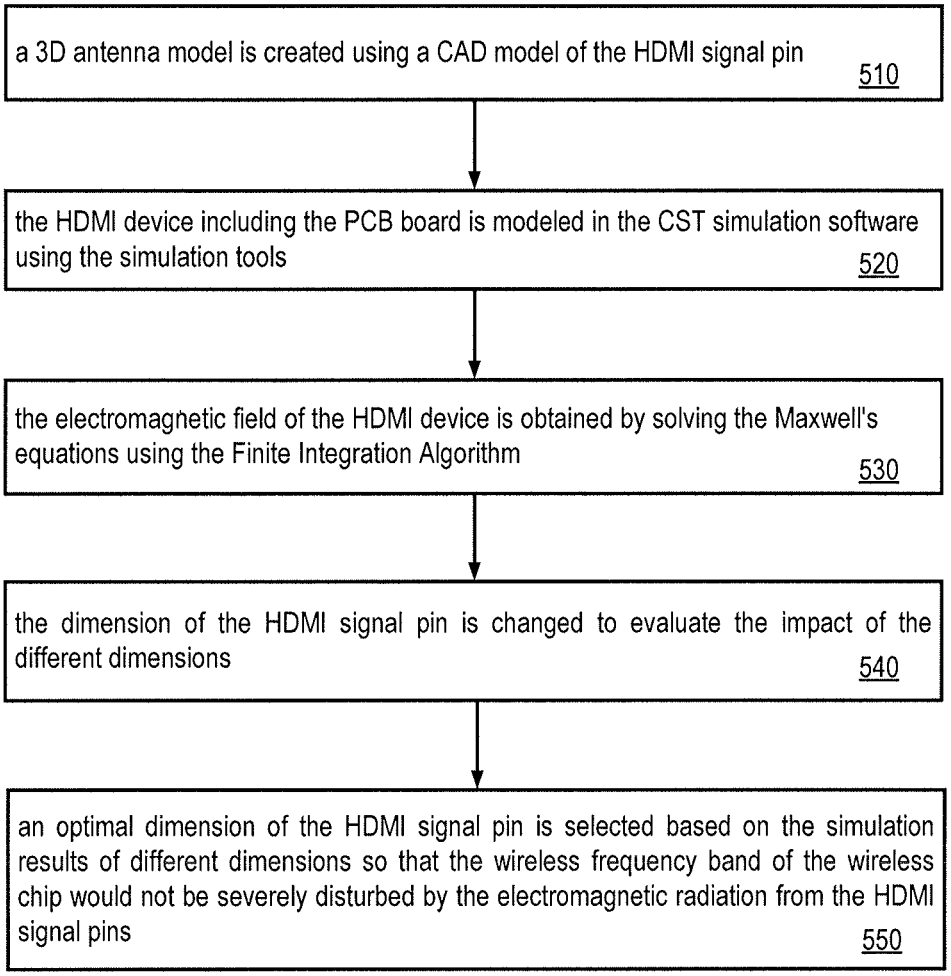
FIG. 5 is a flowchart illustrating a process for simulating an amount of noise radiation that may be generated by the signal pins of the electronic device.

FIG. 5 shows an example flowchart illustrating the process for electromagnetic simulation of a signal pin to predict that signal pin's resonant frequency. In this process, a suitable simulation tool is used, such as 3D electromagnetic simulation tools developed by CST. In step 510, a 3D antenna model is created using a computer aided design (CAD) model of the HDMI signal pin. Modeling the signal pin may involve generating a three dimensional model of the signal pin, as well as one or more of the structures, such as the metal shell 130 around the signal pin. With the signal pin and surrounding structure modeled, in step 520, the HDMI device including the PCB is modeled in the simulation tool. The simulation tool may take the CAD model of the PCB board including the different hardware chips disposed on the PCB board. In step 530, the electromagnetic field of the HDMI device is obtained by solving the Maxwell's equations using the Finite Integration Algorithm. In step 540, the dimension of the HDMI signal pin is changed to evaluate the impact of the different dimensions. The simulation tool may identify a range of parameters relevant to the dimension of the HDMI signal pin according to preset thresholds such as the resonant frequency of the HDMI signal pin. Other thresholds may be introduced if needed. In step 550, an optimal dimension of the HDMI signal pin is selected based on the simulation results of different dimensions so that the wireless frequency band of the wireless chip would not be severely disturbed by the electromagnetic radiation from the HDMI signal pins.

In a first aspect, an apparatus is provided for reducing undesired radio frequency radiation that would otherwise interfere with wireless communication between electronic devices. The apparatus may be a high-definition multimedia interface (HDMI) device that includes a printed circuit board (PCB) including a substrate. The circuit board may include a video processor and a wireless communication processor on the substrate. The wireless communication processor is configured to transmit and receive radio frequency signals in a predetermined range of wireless communication frequencies. The circuit board may further include a contact pad on a first end of the substrate.

The HDMI device also includes an HDMI signal pin having a first end, a second end, and an intermediate portion between the first end and the second end. The first end of the HDMI signal pin is in contact with the contact pad on the first end of the substrate, where the HDMI signal pin has a resonant frequency that does not overlap with the predetermined range of wireless communication frequencies. The HDMI device also includes a metal shell attached to the first end of the substrate and the HDMI signal pin. The metal shell is around the intermediate portion and the second end of the HDMI signal pin, the metal shell and the HDMI signal pin configured to attach to a female HDMI connector. To further reduce the noise radiation from the HDMI signal pin, the HDMI device also includes a lossy dielectric material inside the metal shell. The lossy dielectric material surrounds the intermediate portion of the HDMI signal pin. The lossy dielectric material is configured to absorb radio frequency transmissions in the predetermined range of wireless communication frequencies.

In a second aspect, the apparatus includes a circuit board including a contact pad. The circuit board includes one or more chips on the circuit board. The circuit board further includes a signal pin having a first end, a second end, and an intermediate portion between the first end and the second end. The first end of the signal pin is in contact with the contact pad, where the signal pin has a resonant frequency outside a predetermined frequency range. The apparatus includes a lossy dielectric material surrounding the intermediate portion of the signal pin, where the lossy dielectric material is configured to absorb radio frequency signals from the signal pin in the predetermined frequency range.

In a third aspect, the apparatus includes a circuit board including a contact pad. There is one or more chips on the circuit board. The apparatus may also include a signal pin having a first end, a second end, and an intermediate portion between the first end and the second end. The first end of the signal pin is in contact with the contact pad. The signal pin has a resonant frequency outside a predetermined frequency range.

The various embodiments may be implemented within or provided for use with an electronic device, for example, a mobile device, an e-Book reader, a multimedia system, a communication device, or another electronic device that includes a display. In certain embodiments, the electronic device may be a smart television including a female HDMI connector.

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims. The HDMI connector is introduced as an example embodiment. However, any connector including a signal pin may adopt the design process to select signal pins for connectors, such as, but not limited to universal serial bus (USB) connector, a peripheral component interconnect (PCI) Express connector, a Thunderbolt connector, or any other connector type.

One skilled in the art will realize that a virtually unlimited number of variations to the above descriptions are possible, and that the examples and the accompanying figures are merely to illustrate one or more examples of implementations.

It will be understood by those skilled in the art that various other modifications may be made, and equivalents may be substituted, without departing from claimed subject matter. Additionally, many modifications may be made to adapt a particular situation to the teachings of claimed subject matter without departing from the central concept described herein. Therefore, it is intended that claimed subject matter not be limited to the particular embodiments disclosed, but that such claimed subject matter may also include all embodiments falling within the scope of the appended claims, and equivalents thereof.

In the detailed description above, numerous specific details are set forth to provide a thorough understanding of claimed subject matter. However, it will be understood by those skilled in the art that claimed subject matter may be practiced without these specific details. In other instances, methods, apparatuses, or systems that would be known by one of ordinary skill have not been described in detail so as not to obscure claimed subject matter.

Reference throughout this specification to "one embodiment" or "an embodiment" may mean that a particular feature, structure, or characteristic described in connection with a particular embodiment may be included in at least one embodiment of claimed subject matter. Thus, appearances of the phrase "in one embodiment" or "an embodiment" in various places throughout this specification is not necessarily intended to refer to the same embodiment or to any one particular embodiment described. Furthermore, it is to be understood that particular features, structures, or characteristics described may be combined in various ways in one or more embodiments. In general, of course, these and other issues may vary with the particular context of usage. Therefore, the particular context of the description or the usage of these terms may provide helpful guidance regarding inferences to be drawn for that context.

What is claimed is:

1. A high-definition multimedia interface (HDMI) device, comprising:
    a printed circuit board (PCB) including:
        a video processor;
        a wireless communication system, the wireless communication system is configured to transmit and receive radio frequency signals in a first frequency range, and
        a contact pad on a first end of the PCB;
    an HDMI signal pin having a first end, a second end, and an intermediate portion between the first end and the second end, the first end of the HDMI signal pin being in contact with the contact pad, wherein the HDMI signal pin has a resonant frequency that does not overlap with the first frequency range;
    a metal shell attached to the first end and the HDMI signal pin, the metal shell being disposed around the intermediate portion and the second end of the HDMI signal pin; and
    a lossy dielectric material disposed inside the metal shell, the lossy dielectric material surrounding at least a portion of the intermediate portion of the HDMI signal pin, the lossy dielectric material being configured to absorb signals in the first frequency range.

2. The HDMI device of claim 1, wherein the lossy dielectric material at least partially covers the first end of the HDMI signal pin.

3. An apparatus, comprising:
    a circuit board including a contact pad;
    one or more chips on the circuit board;
    a signal pin having a first end, a second end, and an intermediate portion between the first end and the second end, the first end of the signal pin being in contact with the contact pad, the signal pin having a resonant frequency outside a predetermined frequency range, wherein the one or more chips on the circuit board include a video processor configured to process video data and a wireless communication device configured to communicate using a signal having a frequency in the predetermined frequency range; and
    a lossy dielectric material surrounding the intermediate portion of the signal pin, the lossy dielectric material configured to absorb signals in the predetermined frequency range.

4. The apparatus of claim 3, further comprising:
    a metal shell around the lossy dielectric material and the intermediate portion of the signal pin, the metal shell connected to the circuit board and being configured to attach to a high-definition multimedia interface (HDMI) connector.

5. The apparatus of claim 4, wherein the resonant frequency of the signal pin is outside of the predetermined frequency range when the apparatus streams video data having a video resolution of 720p or higher via the signal pin.

6. The apparatus of claim 5, wherein the one or more chips on the circuit board include a wireless communication system configured to receive the video data in a wireless communication channel in the predetermined frequency range.

7. The apparatus of claim 5, wherein the predetermined frequency range includes a first wireless communication channel operating at 2.4 GHz and a second wireless communication channel operating at 5 GHz.

8. The apparatus of claim 4, wherein the metal shell includes arms that engage the circuit board to secure the signal pin against the contact pad on the circuit board.

9. The apparatus of claim 4, wherein the lossy dielectric material is in contact with the signal pin and the metal shell.

10. The apparatus of claim 3, wherein the lossy dielectric material comprises at least one of silicon absorber and Teflon.

11. The apparatus of claim 3, wherein the lossy dielectric material includes a material having a loss tangent greater than 0.03 and a dielectric constant greater than 5 at a temperature between 70 degrees Celsius and 80 degrees Celsius.

12. The apparatus of claim 3, wherein the circuit board includes a second contact pad and further comprising:
    a second signal pin having a first end, a second end, and an intermediate portion between the first end and the second end, the first end of the second signal pin being in contact with the second contact pad, the second signal pin having a second resonant frequency outside the predetermined frequency range.

13. The apparatus of claim 3, wherein the signal pin has a first length, wherein the first length causes the resonant frequency to be outside of the predetermined frequency range.

14. An apparatus, comprising: a circuit board including a contact pad; one or more chips on the circuit board, wherein the one or more chips include a video processor configured to process video data and a wireless communication system configured to receive frequency signals in a predetermined frequency range; a signal pin having a first end, a second end, and an intermediate portion between the first end and the second end, the first end of the signal pin being electrically coupled to the contact pad, the signal pin having a resonant frequency outside the predetermined frequency range; and a lossy dielectric material surrounding the intermediate portion of the signal pin, the lossy dielectric material configured to absorb signals in the predetermined frequency range, wherein the lossy dielectric material comprises at least one of silicon absorber and Teflon.

15. The apparatus of claim 14, wherein the signal pin has a pin length such that the signal pin has a resonant frequency outside of a working frequency band of the wireless communication system when the apparatus streams the video data via the signal pin, wherein the video data has a video resolution of 720p or higher.

16. The apparatus of claim 15, wherein the wireless communication system is configured to receive the video data in a wireless communication channel in the predetermined frequency range.

17. The apparatus of claim 14, wherein the lossy dielectric material includes a material having a loss tangent greater than 0.03 and a dielectric constant greater than 5 at a temperature between 70 degrees Celsius and 80 degrees Celsius.

* * * * *